(12) United States Patent
Arai et al.

(10) Patent No.: US 12,552,972 B2
(45) Date of Patent: Feb. 17, 2026

(54) CONDUCTIVE ADHESIVE COMPOSITION

(71) Applicant: KYOTO ELEX CO., LTD., Kyoto (JP)

(72) Inventors: Takamitsu Arai, Kyoto (JP); Takayuki Kasugai, Kyoto (JP); Nobuo Ochiai, Kyoto (JP); Satoru Tomekawa, Kyoto (JP)

(73) Assignee: KYOTO ELEX CO., LTD., Kyoto (JP)

( * ) Notice: Subject to any disclaimer, the term of this patent is extended or adjusted under 35 U.S.C. 154(b) by 0 days.

(21) Appl. No.: 18/015,584

(22) PCT Filed: Jul. 14, 2021

(86) PCT No.: PCT/JP2021/026381
§ 371 (c)(1),
(2) Date: Jan. 11, 2023

(87) PCT Pub. No.: WO2022/014625
PCT Pub. Date: Jan. 20, 2022

(65) Prior Publication Data
US 2023/0323162 A1  Oct. 12, 2023

(30) Foreign Application Priority Data
Jul. 17, 2020  (JP) .................................. 2020-123302

(51) Int. Cl.
*C09J 9/02* (2006.01)
*C08G 18/10* (2006.01)
(Continued)

(52) U.S. Cl.
CPC ................ *C09J 9/02* (2013.01); *C08G 18/10* (2013.01); *C08G 18/672* (2013.01); *C08G 18/73* (2013.01);
(Continued)

(58) Field of Classification Search
CPC ........................................................ C09J 9/02
See application file for complete search history.

(56) References Cited

U.S. PATENT DOCUMENTS

| 2007/0185243 A1* | 8/2007 | Terada .................... C08G 59/42 |
| | | 523/457 |
| 2013/0189513 A1 | 7/2013 | Dreezen et al. |

(Continued)

FOREIGN PATENT DOCUMENTS

| EP | 2 749 620 A1 | 7/2014 |
| EP | 3 401 928 A1 | 11/2018 |

(Continued)

OTHER PUBLICATIONS

International Search Report, issued in PCT/JP2021/026381, PCT/ISA/210, dated Oct. 12, 2021.

(Continued)

*Primary Examiner* — William D Young
(74) *Attorney, Agent, or Firm* — Birch, Stewart, Kolasch & Birch, LLP

(57) ABSTRACT

The present invention relates to an electrically conductive adhesive composition including: a conductive powder (A) and a curable component (B) which has a content of 20 5 parts by mass or more when an amount of the conductive powder (A) is 100 parts by mass; and a phosphoric acid-containing curable component (C) having a general formula of formula (1) or (2), and having a molecular weight within a range of 150 to 1000, in which the phosphoric acid-containing curable component (C) has a content of 0.01 parts by mass or more and 5 parts by mass or less when a total amount of the conductive powder (A) and the 10 curable component (B) is 100 parts by mass.

13 Claims, 2 Drawing Sheets

(51) Int. Cl.
*C08G 18/67* (2006.01)
*C08G 18/73* (2006.01)
*C08K 3/08* (2006.01)
*C09J 11/04* (2006.01)
*C09J 175/14* (2006.01)
*H01B 1/22* (2006.01)
*H10F 77/20* (2025.01)

(52) U.S. Cl.
CPC ............ *C09J 11/04* (2013.01); *C09J 175/14* (2013.01); *H01B 1/22* (2013.01); *C08K 2003/0806* (2013.01); *C08K 2201/001* (2013.01); *C08K 2201/003* (2013.01); *H10F 77/211* (2025.01)

(56) References Cited

U.S. PATENT DOCUMENTS

| | | | | |
|---|---|---|---|---|
| 2016/0017071 | A1* | 1/2016 | Hase | C09J 4/00 252/182.14 |
| 2018/0079935 | A1* | 3/2018 | Ota | C09J 171/00 |

FOREIGN PATENT DOCUMENTS

| | | |
|---|---|---|
| JP | 2001-257220 A | 9/2001 |
| JP | 2006-299184 A | 11/2006 |
| JP | 2010-174311 A | 8/2010 |
| JP | 2013-98230 A | 5/2013 |
| JP | 2013-541611 A | 11/2013 |
| JP | 2014-170794 A | 9/2014 |
| JP | 5746797 B1 | 7/2015 |
| JP | 2017-145382 A | 8/2017 |
| JP | 2020-164744 A | 10/2020 |
| WO | WO 2012/102077 A1 | 8/2012 |
| WO | WO 2016/140204 A1 | 9/2016 |
| WO | WO 2016/171253 A1 | 10/2016 |

OTHER PUBLICATIONS

Written Opinion of the International Searching Authority, issued in PCT/JP2021/026381, PCT/ISA/237, dated Oct. 12, 2021.
Japanese Office Action for Japanese Application No. 2020-123302, dated Jun. 20, 2023, with an English translation.
Extended European Search Report for European Application No. 21843015.5, dated Jun. 21, 2024.
Chinese Office Action and Search Report for Chinese Application No. 202180048171.X, dated May 24, 2025, with English translation.
Chinese Office Action and Search Report for Chinese Application No. 202180048171.X, dated Oct. 31, 2025, with English translation of the Office Action.

* cited by examiner

CONDUCTIVE ADHESIVE COMPOSITION

TECHNICAL FIELD

The present invention relates to an electrically conductive adhesive composition, and more particularly, to an electrically conductive adhesive composition by which good adhesive strength between adherends to be adhered can be achieved.

BACKGROUND ART

In recent years, electrically conductive adhesives (ECA) have been widely used in the field of electrical devices, electronic devices, or the like. The electrically conductive adhesives basically contain a conductive powder and a curable component. Various adherends can be conductively adhered by appropriately selecting the kind, composition, or the like of the curable component, and the conductivity can be adjusted by appropriately selecting the kind of conductive powder.

For example, Patent Literature 1 describes an electrically conductive adhesive using at least one resin component (curable component) and conductive particles (conductive powder) that have a micron size and a submicron size, Patent Literature 1 states that examples of the resin component include an epoxy resin, a benzoxazine resin, an acrylate resin, a bismaleimide resin, a cyanate ester resin, and a polyisobutylene resin, and the epoxy resin or the benzoxazine resin is advantageous as the resin component from the viewpoint of achieving good mechanical strength or high thermal stability when the electrically conductive adhesive is cured.

CITATION LIST

Patent Literature

Patent Literature 1: JP2013-541611A

SUMMARY OF INVENTION

Technical Problem

The electrically conductive adhesives are required to have both adhesion and conductivity after curing. In Patent literature 1, the strength of an adhesive is also cited as one of the problems of the electrically conductive adhesive. However, as described above. Patent Literature 1 states that it is advantageous to select a specific resin for the mechanical strength after curing, but does not particularly state that good adhesion (for example, adhesive strength) is imparted to the electrically conductive adhesive. In Patent Literature 1, as a factor related to good adhesion, it is suggested that the conductive particles are made to have a micron size and a content of the conductive particles is optimized.

The present invention has been made to solve such problems, and an object of the present invention is to provide an electrically conductive adhesive composition containing a conductive powder and a curable component to achieve good adhesive strength.

Solution to Problem

In order to solve the above problems, an electrically conductive adhesive composition according to the present invention includes: a conductive powder (A) and a curable component (B) which has a content of 20 parts by mass or more when an amount of the conductive powder (A) is 100 parts by mass; and a phosphoric acid-containing curable component (C) having a general formula of the following formula (1) or (2), and having a molecular weight within a range of 150 to 1000.

[Chem. 1]

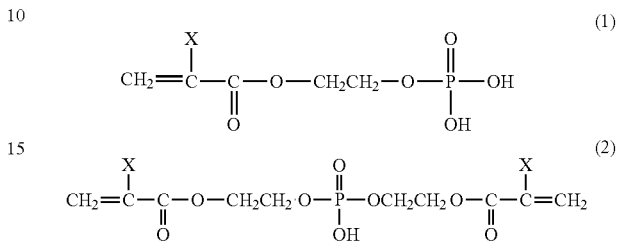

Provided that X in the above formula (1) or (2) is a hydrogen atom (H) or a methyl group ($CH_3$).

The phosphoric acid-containing curable component (C) has a content of 0.01 parts by mass or more and 5 parts by mass or less when a total amount of the conductive powder (A) and the curable component (B) is 100 parts by mass.

According to the above configuration, by using the phosphoric acid-containing curable component (C) in addition to the curable component (B), not only the adhesive strength of the obtained electrically conductive adhesive composition become better, hut also the resistance of the cured product can be reduced. Accordingly, in the electrically conductive adhesive composition containing the conductive powder (A) and the curable component (B), not only better adhesive strength can be achieved, but also the resistance of the cured product can be reduced. Therefore, since the electrically conductive adhesive composition can have good conductive performance, the content of the conductive powder (A) can be relatively reduced. Therefore, in the electrically conductive adhesive composition containing the conductive powder (A) and the curable component (B), not only good adhesive strength can be achieved, but also good conductivity can be achieved even when the content of the conductive powder (A) is reduced.

In the electrically conductive adhesive composition having the above configuration, the conductive powder (A) may be at least one of a silver powder, a silver alloy powder, and a silver-coated powder.

In the electrically conductive adhesive composition having the above configuration, the curable component (B) may be an acrylic resin or a curable composition that forms an acrylic resin when being cured.

The electrically conductive adhesive composition having the above configuration may be used by being applied to a base material by a printing machine or a dispenser.

The electrically conductive adhesive composition having the above configuration may be used for adhering solar cells constituting a solar cell module.

Advantageous Effects of Invention

In the present invention, the above configuration has an effect in which good adhesive strength can be achieved in the electrically conductive adhesive composition containing the conductive powder and the curable component.

DESCRIPTION OF EMBODIMENTS

Figure 1:
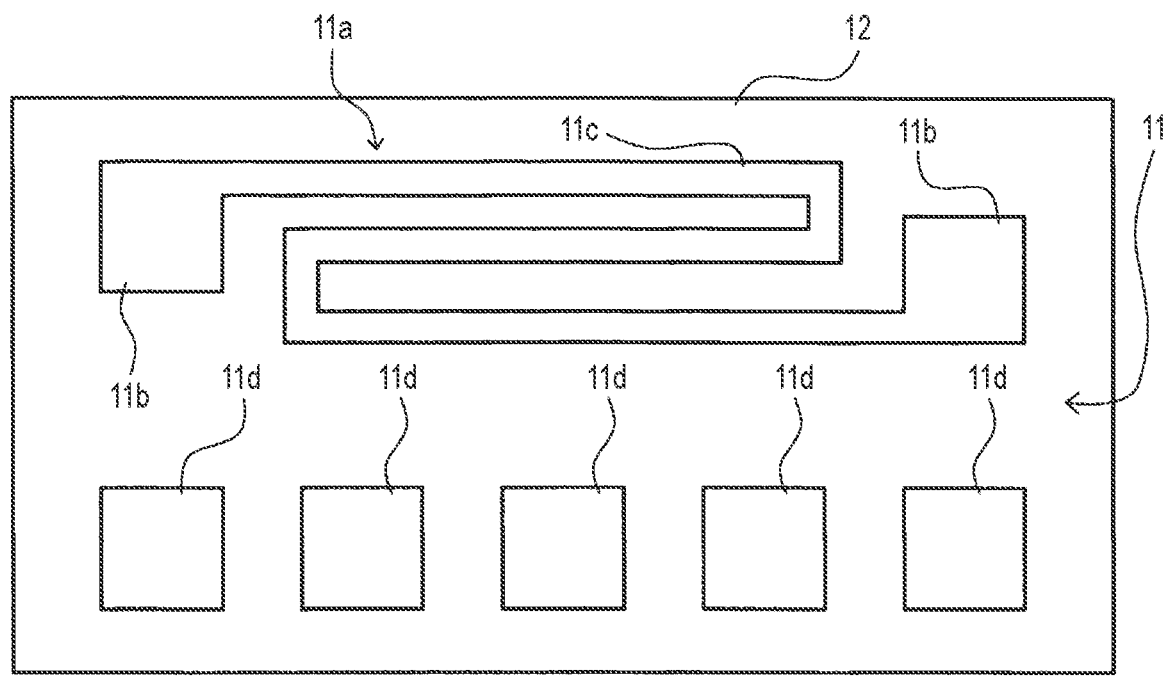
FIG. 1 is a plan view schematically illustrating a configuration of an evaluation conductor pattern used for evaluation of conductivity and adhesive strength of an electrically conductive adhesive composition after curing in Examples and the like of the present disclosure.

Hereinafter, an example of a preferred embodiment of the present disclosure will be specifically described. An electrically conductive adhesive composition according to the present disclosure contains a conductive powder (A) and a curable component (B), and a content of the curable component (B) is 20 parts by mass or more when an amount of the conductive powder (A) is 100 parts by mass. The electrically conductive adhesive composition according to the present disclosure further contains a phosphoric acid-containing curable component (C) having a general formula of formula (1) or (2) described below, and having a molecular weight within a range of 150 to 1000, and when a total amount of the conductive powder (A) and the curable component (B) is 100 parts by mass, a content of the phosphoric acid-containing curable component (C) is within a range of 0.01 parts by mass or more and 5 parts by mass or less.

[Conductive Powder (A)]

The conductive powder (A) contained in the electrically conductive adhesive composition according to the present disclosure is not particularly limited as long as it is a powder (particle) having conductivity. The material of the conductive powder (A) is also not particularly limited, and a conductive material having a relatively low resistance can be exemplified from the viewpoint of achieving good conductivity. Specifically, for example, gold, silver, copper, and alloys thereof may be preferably used, Among these, particularly, a powder containing silver may be suitably used.

A specific material configuration of the conductive powder (A) is also not particularly limited, and examples thereof include a powder substantially made of one kind of metal (or conductive material), an alloy powder made of a plurality of kinds of metals, and a composite material powder made of a metal and a non-metal. Examples of the composite material powder include a coated powder having a configuration in which a surface of a non-metal powder or a metal powder having a relatively high resistance is coated with a metal having a relatively low resistance.

In a case where silver is employed as the material of the conductive powder (A), examples thereof include a silver powder, a silver alloy powder, a silver-coated copper powder, a silver-coated nickel powder, a silver-coated aluminum powder, and a silver-coated glass powder. That is, a preferable example of the conductive powder (A) in the present disclosure includes at least one of a silver powder, a silver alloy powder, and a silver-coated powder.

A shape of the conductive powder (A) is not particularly limited, and various shapes can be selected and used. Typical examples thereof include a powder having a substantially spherical shape (a spherical powder), a powder having a flake shape (a flaky powder), and a dendritic powder.

Depending on various conditions such as a specific composition, a specific use, and a specific physical property of the electrically conductive adhesive composition, it is preferable to use a combination of a spherical powder and a flaky powder. By using the powders having different shapes in combination as described above, the conductive powder (A) can be satisfactorily filled after the curable component (B) is cured.

Note that the flaky powder in the present disclosure may be powder having a shape close to a flat sheet or a thin cuboid when viewed as a whole even if the flaky powder is partially uneven and deformed. The flake shape can be rephrased as a sheet shape or a scale-like shape. In addition, the spherical powder in the present disclosure may be a powder having a three-dimensional shape closer to a cube than a cuboid when viewed as a whole even if the powder is partially uneven and deformed. The spherical shape can be rephrased as a granular shape.

The specific physical properties of the conductive powder (A) are not particularly limited, and the average particle diameter, the specific surface area, the tap density, and the like of the conductive powder (A) may be within known ranges. Among these, the average particle diameter (median diameter) may be, for example, within a range of 0.1 µm to 10 µm. When the conductive powder (A) is a flaky powder, the average particle diameter may be within a range of 2 µm to 20 µm. A method for measuring the average particle diameter of the conductive powder (A) is not particularly limited, and in the present disclosure, a measurement method using a particle size distribution measuring device is employed as described in Examples below.

In a case where the conductive powder (A) is a coated powder, the applying amount of the conductive material (metal such as gold, silver, and copper) to be applied is not particularly limited. When the mass of an original powder not coated with the conductive material is 100% by mass, the applying amount of the conductive material may be, for example, within a range of 5% by mass to 30% by mass, may be within a range of 6% by mass to 25% by mass, or may be within a range of 7.5% by mass to 20% by mass.

In the electrically conductive adhesive composition according to the present disclosure, only one kind of powder may be used, or two or more kinds of powders may be appropriately combined and used as the conductive powder (A). Here, the kind of the conductive powder (A) includes not only a difference in materials and a difference in shapes (spherical or a flake shape) but also a difference in an average particle diameter or the like. In Examples described later, examples in which a spherical silver powder (silver powder 1, abbreviation A1) and a flaky silver powder (silver powder 2, abbreviation A2) are combined as the conductive powder (A) are described (see Table 1). It is needless to say that the coated powders may be used in combination.

In the electrically conductive adhesive composition according to the present disclosure, "another conductive powder" made of a material other than a metal material having a relatively low resistance, such as gold, silver, and copper, may be used in combination as the conductive powder (A). Examples of such "another conductive powder" include a nickel powder, an aluminum powder, a lead powder, and a carbon powder.

A method for producing the conductive powder (A) is not particularly limited, and a known method may be used. Examples of the spherical powder include, but are not particularly limited to, a powder produced by a wet reduction method, and a spherical powder produced by other known methods such as an electrolysis method and an atomization method. Alternatively, in the case of the flaky powder, the flaky powder can be produced by using the spherical powder produced by a known method as a raw powder and subjecting the raw powder to a known mechanical treatment. The physical properties of the raw powder, such as the particle diameter and the degree of aggregation, may be appropriately selected in accordance with the purpose of use of the electrically conductive adhesive composition (the kind of an electrode, a wiring, or the like, or the kind of an electronic component or an electronic device including the electrode, the wiring, or the like).

[Curable Component (B)]

The curable component (B) contained in the electrically conductive adhesive composition according to the present disclosure may be any component as long as it enables the conductive powders (A) to be electrically connected to each other by curing and functions as a curable binder that adheres to an adherend. A typical example is a thermosetting resin. Examples of the general thermosetting resin include an acrylic resin, an epoxy resin, a silicone resin, a phenol resin, a polyester resin, a polyurethane resin, a melamine resin, and a polyimide resin. Among these, an acrylic resin may be particularly preferably used. Depending on the kind of the resin, the curable component (B) before curing may also be a monomer or a prepolymer instead of a polymer. Therefore, in the present disclosure, the curable component (B) includes not only a curable resin but also a curable composition that forms a resin by curing.

In the present disclosure, the specific kind of the acrylic resin suitably used as the curable component (B) is not particularly limited. In Examples described below, three kinds of acrylic compounds are used in combination as the curable component (B). Alternatively, one or two kinds of acrylic compounds may be used, four or more kinds of acrylic compounds may be used, or other monomers or prepolymers polymerizable with the acrylic compounds may be used in combination.

Typical examples of the acrylic compound include chain alkyl (meth)acrylates such as (meth)acrylate (acrylate or methacrylate), ethyl (meth)acrylate, propyl (meth)acrylate, butyl (meth)acrylate, pentyl (meth)acrylate, hexyl (meth)acrylate, heptyl (meth)acrylate, octyl (meth)acrylate, isoamyl (meth)acrylate (isopentyl (meth)acrylate), isooctyl (meth)acrylate, 2-ethylhexyl (meth)acrylate, nonyl (meth)acrylate, decyl (meth)acrylate, dodecyl (meth)acrylate (lauryl (meth)acrylate), and stearyl (meth)acrylate (octadecyl (meth)acrylate); cyclic alkyl (meth)acrylates such as cyclohexyl (meth)acrylate and isobornyl (meth)acrylate; alkoxy group-containing (meth)acrylates such as 1-methoxyethyl (meth)acrylate, ethoxy-diethylene glycol (meth)acrylate, and methoxy-triethylene glycol (meth)acrylate; aryl (meth)acrylates such as benzyl (meth)acrylate, phenyl (meth)acrylate, phenoxyethyl (meth)acrylate, phenoxydiethylene glycol (meth)acrylate, phenoxytetraethylene glycol (meth)acrylate, nonylphenoxyethyl (meth)acrylate, and nonylphenoxytetraethylene glycol (meth)acrylate; (meth)acrylate urethane prepolymers such as phenyl glycidyl ether acrylate hexamethylenediisocyanate urethane prepolymer, pentaerythritol triacrylate hexamethylenediisocyanate urethane prepolymer, pentaerythritol triacrylate toluene diisocyanate urethane prepolymer, and dipentaerythritol pentaacrylate hexamethylenediisocyanate urethane prepolymer; (meth)acrylate epoxy esters such as bisphenol A diglycidyl ether (meth)acrylic acid adduct and 2-hydroxy-3-phenoxypropyl (meth)acrylate; amino (meth)acrylates such as dimethylaminoethyl (meth)acrylate and dimethylaminopropyl (meth)acrylate; and polyfunctional (meth)acrylates such as polyethylene glycol di(meth)acrylate, polypropylene glycol di(meth)acrylate, neopentyl glycol di(meth)acrylate, trimethylolpropane tri(meth)acrylate, ditrimethylolpropane tetra(meth)acrylate, ethylene glycol di(meth)acrylate, and diethylene glycol di(meth)acrylate. Only one kind of these acrylic compounds may be used, or two or more kinds thereof may be used in combination as appropriate.

In Examples described below, three kinds of acrylic compounds are used in combination as the curable component (B). Among these, a compound 1 (abbreviation B1) is isoamyl acrylate, a compound 2 (abbreviation B2) is phenoxyethyl acrylate, and a compound 3 (abbreviation B3) is phenyl glycidyl ether acrylate hexamethylene diisocyanate urethane prepolymer (see Table 2). Therefore, in the present disclosure, when the curable component (B) is an acrylic resin (or a curable composition that forms an acrylic resin by curing), a combination of an alkyl (meth)acrylate, an aryl (meth)acrylate, and a (meth)acrylate urethane prepolymer can be exemplified as a preferable example. In a case where a plurality of kinds of acrylic compounds are used in combination as the curable component (B), a mixing ratio (blending ratio) of the respective acrylic compounds is not particularly limited.

In a case where the curable component (B) is an acrylic resin (or a curable composition that forms an acrylic resin by curing), a polymerization initiator is used. Although specific examples of the polymerization initiator are not particularly limited, organic peroxides and azo initiators can be exemplified as typical polymerization initiator.

Typical examples of the organic peroxide include peroxyesters such as t-butylperoxy-2-ethylhexanoate, t-hexylperoxyisopropyl monocarhonate, t-hutylperoxybenzoate, t-butylperoxyneodecanoate, t-butylperoxylaurate, t-butylcumyl peroxide, t-butylperoxyacetate, and 1,1,3,3-tetramethylbutylperoxy-2-ethylhexanoate; ketone peroxides such as methyl ethyl ketone peroxide hydroperoxides such as 1,1,3,3-tetramethylbutyl hydroperoxide, cumene hydroperoxide, and p-menthane hydroperoxide; and diallyl peroxides such as di-t-butyl peroxide.

Typical examples of the azo initiators include 2,2'-azobisisobutyronitrile, 2,2'-azobis(2-methylbutyronitrile), 2,2'-azobis(2,4-dimethylvaleronitrile), 1,1'-azobis-1-cyclohexanecarbonitrile, dimethyl-2,2'-azobisisobutyrate, 2-(carbamoylazo) isobutyronitrile, 2-phenylazo-4-methoxy-2,4-dimethylvaleronitrile, azodi-t-octane, and azodi 4-butane.

Only one kind of these polymerization initiators may be used, or two or more kinds thereof may be used in combination as appropriate. In addition, a use amount or a use condition of the polymerization initiator is not particularly limited, and the polymerization initiator may be used in a known use amount or use condition. In Examples described below, t-butylperoxy-2-ethylhexanoate is used as the polymerization initiator (see Table 2).

[Phosphoric Acid-Containing Curable Component (C)]

The electrically conductive adhesive composition according to the present disclosure contains the conductive powder (A) and the curable component (B) described above as basic components, and further contains the phosphoric acid-containing curable component (C) as an additional curable component. The phosphoric acid-containing curable component (C) has a general formula of the following formula (1) or (2), and has a molecular weight within a range of 150 to 1000. In the following formula (1) or (2), X is a hydrogen atom (H) or a methyl group ($CH_3$).

[Chem. 1]

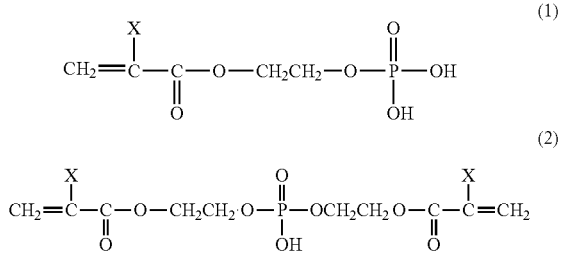

That is, in the electrically conductive adhesive composition according to the present disclosure, a compound represented by the formula (1) or a compound represented by the formula (2) may be blended, both of the two kinds of compounds may be blended, or a combination of compounds, which react with each other to obtain a compound represented by the formula (1) or (2), may be blended, in addition to the curable component (B).

In addition, X in the above formula (1) or (2) is a hydrogen atom or a methyl group, and for example, in a case where the electrically conductive adhesive composition according to the present disclosure contains the compound represented by the above formula (1) as the phosphoric acid-containing curable component (C), the electrically conductive adhesive composition may contain a compound in which X is a hydrogen atom and a compound in which X is a methyl group. The same applies to the compound represented by the formula (2).

Specific examples of the phosphoric acid-containing curable component (C) include acryloyloxyethyl acid phosphate (phosphoric acid acryloyloxyethyl) and methactyloyloxyethyl acid phosphate (phosphoric acid methacryloyloxyethyl), acryloyloxy group (acryloyloxy group) or a methacryloyloxy group (methacryloyloxy group) may be bonded to only one of three hydroxy groups (—OH) of phosphoric acid (the above formula (1)), or may be bonded to two hydroxy groups (the above formula (2)). In Examples described below, a phosphoric acid-containing compound 1 (abbreviation 1) is a compound having a structure in which one methacryloyloxy group is bonded to phosphoric acid, and a phosphoric acid-containing compound 2 (abbreviation 2) is a compound having a structure in which two methacryloyloxy groups are bonded to phosphoric acid.

The electrically conductive adhesive composition according to the present disclosure contains the phosphoric acid-containing curable component (C) within a predetermined range described below in addition to the basic components including the conductive powder (A) and the curable component (B). According to this configuration, when the electrically conductive adhesive composition is cured and a cured adhesive layer that conductively adheres adherends to each other is formed, it has become clear that not only the adhesion can be further improved, but also the resistance of the cured adhesive layer can be reduced, as described later. Accordingly, even if the content of the conductive powder (A) is relatively reduced, good adhesion and conductivity can be achieved in the cured adhesive layer.

[Production and Use of Electrically Conductive Adhesive Composition]

The method for producing the electrically conductive adhesive composition according to the present disclosure is not particularly limited, and a method known in the field of electrically conductive adhesive compositions can be suitably used. A typical example thereof includes a method in which the above-described components are blended at a predetermined blending ratio (on a mass basis), to form a paste using a known kneading apparatus. Examples of the kneading apparatus include a three-roll mill.

In the electrically conductive adhesive composition according to the present disclosure, the blending amount (content) of the conductive powder (A) is preferably relatively small as described above. Specifically, the electrically conductive adhesive composition according to the present disclosure contains the conductive powder (A) and the curable component (B) as basic components, and a lower limit of the content of the curable component (B) is 20 parts by mass or more, and the lower limit may be 25 parts by mass or more, 30 parts by mass or more, or 35 parts by mass or more when the conductive powder (A) of the two components as the basic components is defined as 100 parts by mass as a reference.

When the content of the curable component (B) is less than 20 parts by mass, the content of the conductive powder (A) in the electrically conductive adhesive composition is relatively large. In this case, the conductivity of the cured adhesive layer obtained by curing the electrically conductive adhesive composition is good, but the effect generated by the blending of the phosphoric acid-containing curable component (C) may be canceled out since the resistance of the cured adhesive layer can be reduced by containing the phosphoric acid-containing curable component (C) as described below. On the other hand, an upper limit of the content of the curable component (B) is not particularly limited, and the content of the curable component (B) can be set to be large to the extent that the required conductivity can be achieved in accordance with the various conditions as described above in the electrically conductive adhesive composition.

In the electrically conductive adhesive composition according to the present disclosure, a content (blending amount) of the phosphoric acid-containing curable component (C) relative to the basic components may be within a range of 0.01 parts by mass or more and 5 parts by mass or less (0.01 to 5 parts by mass) when the total amount of the basic components (the total amount of the conductive powder (A) and the curable component (B)) is 100 parts by mass.

When the content of the phosphoric acid-containing curable component (C) is less than (C) parts by mass, the effects generated by blending of the phosphoric acid-containing curable component (C) (achievement of good adhesive strength and reduction in resistance in the cured adhesive layer) may not be sufficiently obtained. When the content of the phosphoric acid-containing curable component (C) exceeds 5 parts by mass, not only the effects corresponding to the blending amount cannot be obtained, but also physical properties such as adhesive strength expected owing to the curable component (B) may be influenced by the too large amount of the phosphoric acid-containing curable component (C).

The electrically conductive adhesive composition according to the present disclosure may contain various additives known in the field of the electrically conductive adhesive composition, in addition to the above-described components (the conductive powder (A), the curable component (B), and the phosphoric acid-containing curable component (C)), as necessary. The additives are not particularly limited, and specific examples thereof include a solvent, a leveling agent, an antioxidant, an ultraviolet absorber, a silane coupling agent, an antifoaming agent, and a viscosity modifier. These additives may be added to the extent that the effects of the present disclosure are not impaired. The additives preferably do not include a boron-containing complex containing a boron compound such as alkyldiaryl borane, dialkylarylborane, trialkylborane, triarylborane, and boron hydride and a basic substance such as alkylamine, dialkylamine, and trialkylamine.

A method for forming a pattern to be a cured adhesive layer using the electrically conductive adhesive composition according to the present disclosure is not particularly limited, and various known formation methods can be suitably used. A typical example thereof includes a screen printing method as shown in Examples described below, and printing methods such as a gravure printing method, an offset printing method, an inkjet method, a dispenser method, and a dip method may also be applied. Therefore, the electrically conductive adhesive composition according to the present disclosure may be any composition as long as it can be used by being applied onto a base member by a printing machine or a dispenser.

The electrically conductive adhesive composition according to the present disclosure can be widely used for formation of high-definition electrodes, wirings, and the like, adhesion of electronic components, and the like. Specifically, for example, the electrically conductive adhesive composition can be suitably used for applications such as a collector electrode of a solar cell; an internal electrode or an external electrode of a chip-type electronic component; and adhesion of an electrode or a wiring of a component used for radio frequency identification (RFID), an electromagnetic wave shield, a vibrator, a membrane switch, a touch panel, or an electroluminescence.

The electrically conductive adhesive composition according to the present disclosure can be suitably applied particularly to the field of solar cells among the applications described above. Specifically, the electrically conductive adhesive composition according to the present disclosure may be suitably used for, for example, adhesion of a solar cell module.

Figure 3A:
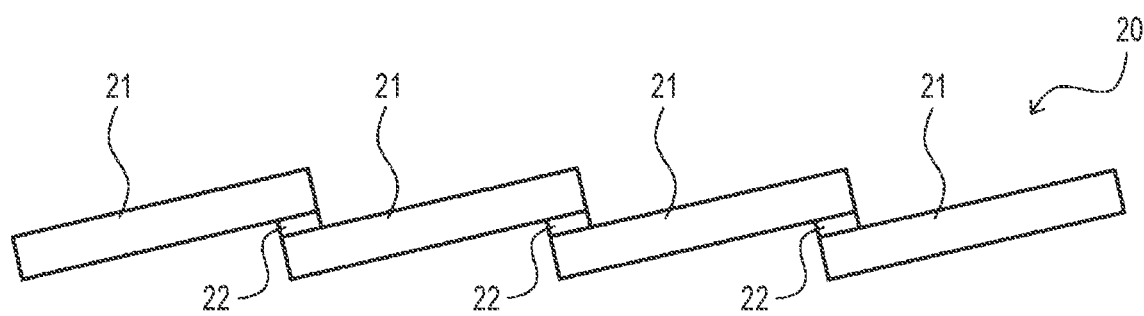
FIG. 3A is a schematic side view illustrating a configuration of a solar cell module as an example to which an electrically conductive adhesive composition according to the present disclosure is applied.
Figure 3B:
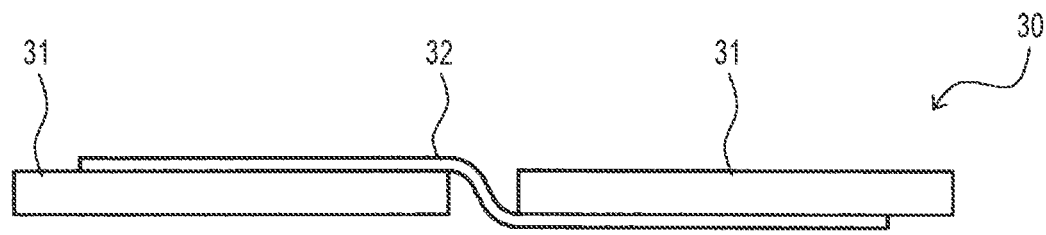
FIG. 3B is a schematic side view illustrating a configuration of a general solar cell module in the related art.

As shown in FIG. 3B, a solar cell module 30 according to the related art generally has a configuration in which a plurality of solar cells 31 are connected by a ribbon-shaped wiring member called an interconnector 32. In contrast, in recent years, as shown in FIG. 3A, there has been proposed a solar cell module 20 having a configuration in which a plurality of solar cells 21 are partially sequentially stacked and obliquely arranged such that a lower surface of a long side of any solar cell 21 overlaps an upper surface of a long side of another solar cell 21. In the solar cell module 20, an electrically conductive adhesive is used instead of the interconnector 32 to connect the solar cells 21 to each other.

When the long sides of the solar cells 21 are adhered to each other, the electrically conductive adhesive (a cured adhesive layer 22 after curing) is required to have good adhesive strength and good conductivity. Since the solar cells 21 are adhered to each other at a part of the long sides, the performance of the solar cell module 20 produced by adhering the plurality of solar cells 21 may be influenced if good adhesive strength is not obtained. In addition, if there is no good conductivity, good conduction cannot be achieved between the solar cells 21, and the performance of the solar cell module 20 may also be influenced.

As described above, the electrically conductive adhesive composition according to the present disclosure contains the phosphoric acid-containing curable component (C) in addition to the conductive powder (A) and the curable component (B).

The phosphoric acid-containing curable component (C) contributes to achieving good adhesive strength for the cured adhesive layer 22, and it has been revealed that not only good adhesive strength but also a reduction in resistance of the cured adhesive layer 22 can be achieved as shown in Examples described below. Accordingly, not only the solar cells 21 can be adhered to each other satisfactorily by the cured adhesive layer 22, but also good conductivity can be achieved even when the content of the conductive powder (A) is relatively reduced. Therefore, the electrically conductive adhesive composition according to the present disclosure can be preferably applied particularly to the production of the solar cell module 20 as shown in FIG. 3A.

EXAMPLES

The present invention will be described more specifically based on Examples and Comparative Examples, but the present invention is not limited thereto. Those skilled in the art can make various changes, modifications, and alterations without departing from the scope of the present invention. The physical properties and the like in the following Examples and Comparative Examples were measured and evaluated as follows.

[Average Particle Diameter (Median Diameter) of Conductive Powder]

An average particle diameter (median diameter) of the conductive powder (A) was evaluated by a laser diffraction method. 0.3 g of a sample of the conductive powder (A) was weighed in a 50 ml beaker, 30 ml of isopropyl alcohol was added thereto, and the mixture was dispersed by treatment for 5 minutes using an ultrasonic cleaner (USM-1 manufactured by AS ONE Corporation), and the median diameter was measured and evaluated using a particle size distribution measuring device (Microtrac MT3300EXII manufactured by Nikkiso Co., Ltd.).

[Evaluation of Conductivity and Adhesive Strength of Electrically Conductive Adhesive Composition]

As shown in FIG. 1, a printing pattern 11 was printed on an alumina substrate 12 using each of the electrically conductive adhesive compositions of Examples and Comparative Examples and a printing machine. The printing pattern 11 includes one wiring pattern 11a and five pad patterns 11d. The wiring pattern 11a has rectangular terminals 11b at both ends thereof and a wiring portion 11c which has a zigzag shape. The wiring portion 11c has an aspect ratio of 75. The five pad patterns 11d are arranged in a line adjacent to the wiring pattern 11a, and each of the five pad patterns 11d has a square shape of 2 mm×2 mm.

Figure 2:
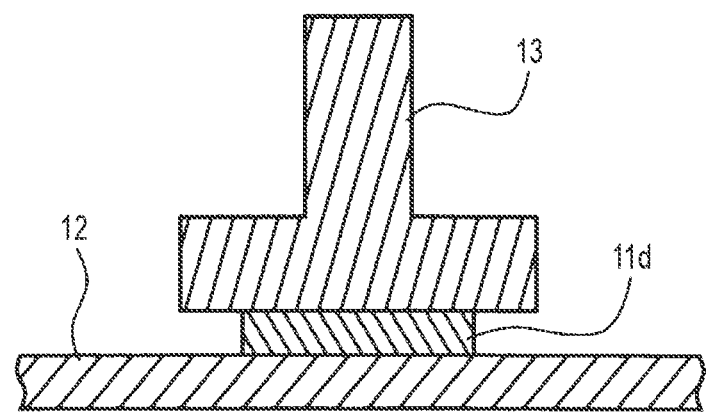
FIG. 2 is a partial cross-sectional view schematically illustrating a state in which a rivet is adhered to a pad constituting the evaluation conductor pattern illustrated in FIG. 1.

Next, as shown in FIG. 2, an aluminum rivet 13 having a circular fixing surface with a diameter of 4 mmm was placed on the pad pattern 11d (2 mm×2 mm) on the alumina substrate 12. The alumina substrate 12 on which the rivet 13 was placed was heated at 150° C. for 30 seconds using a hot plate to cure the electrically conductive adhesive composition (printing pattern 11) (to form a cured adhesive layer), thereby obtaining a test piece for evaluation of conductivity and adhesive strength.

The conductivity of the cured adhesive layer was evaluated by the volume resistivity of the wiring pattern 11a. Specifically, the film thickness of the wiring pattern 11a was measured with a surface roughness tester (SURFCOM 480A manufactured by Tokyo Seimitsu Co., Ltd.), the electrical resistance was measured with a digital multimeter (R6551 manufactured by Advantest Corporation), and the volume resistivity (Ω·cm) of the wiring pattern 11a was calculated based on the film thickness, the electric resistance, and the aspect ratio of the wiring portion 11c, thereby evaluating the volume resistivity as a resistance value of the cured adhesive layer.

The adhesive strength of the cured adhesive layer was evaluated by the adhesion of the rivet 13 to the pad pattern 11d. Specifically, a shear force was applied in a horizontal direction to the rivet 13 mounted on the pad pattern 11d, and the strength for detaching the rivet 13 from the pad pattern 11d was measured. The adhesive strength of the cured adhesive layer was evaluated as follows: a case where the strength was 15 MPa or more was evaluated as "A"; a case where the strength was 5 MPa or more and less than 15 MPa was evaluated as "B"; and a case where the strength was less than 5 MPa was evaluated as "C".

[Conductive Powder (A), Curable Component (B), and Phosphoric Acid-Containing, Curable Component (C)]

In the following Examples and Comparative Examples, two powders among the two kinds shown in the following Table 1 were used as the conductive powder (A). The abbreviations in Tables 1, 2, and 3 below are used to indicate the components of Examples or Comparative Examples in Tables 4 and 5.

TABLE 1

| Conductive powder (A) | | | Average particle |
|---|---|---|---|
| Kind | Abbreviation | Shape | diameter [μm] |
| Silver powder 1 | A1 | Spherical shape | 1.7 |
| Silver powder 2 | A2 | Flake shape | 7.9 |

In the following Examples and Comparative Examples, three kinds of acrylic compounds shown in the following Table 2 were used in combination as the curable component (B). As the polymerization initiator of the curable component (B), those shown in Table 3 below were used.

TABLE 2

| Curable component (B) or the like | | Product name or compound name |
|---|---|---|
| Kind | Abbreviation | [manufacturer name] |
| Compound 1 | B1 | Light acrylate IAA [manufactured by Kyoeisha Chemical Co., Ltd.] (isoamyl acrylate) |
| Compound 2 | B2 | Light acrylate PO-A [manufactured by Kyoeisha Chemical Co., Ltd.] (phenoxyethyl acrylate) |
| Compound 3 | B3 | AH-600 [manufactured by Kyoeisha Chemical Co., Ltd.] (phenyl glycidyl ether acrylate hexamethylene diisocyanate urethane prepolymer) |
| Polymerization initiator | — | Perbutyl ®O [manufactured by NOF Corporation] (t-butylperoxy-2-ethylhexanoate) |

In the following Examples and Comparative Examples, any one of the three kinds of phosphoric acid-containing compounds shown in the following Table 3 was used as the phosphoric acid-containing curable component (C).

TABLE 3

| Phosphoric acid-containing curable component (C) | | Product name or compound |
|---|---|---|
| Kind | Abbreviation | name [manufacturer name] |
| Phosphoric acid-containing compound 1 | C1 | Light ester P-1M [manufactured by Kyoeisha Chemical Co., Ltd.] (2-Methacryloyloxyethyl Acid Phosphate) |
| Phosphoric acid-containing compound 2 | C2 | Light ester P-2M [manufactured by Kyoeisha Chemical Co., Ltd.] (2-Methacryloyloxyethyl Acid Phosphate) |
| Phosphoric acid-containing3 compound | C3 | JP-502 [manufactured by Johoku Chemical Co., Ltd] (ethyl acid phosphate) |

Example 1

As shown in Table 4, a spherical silver powder 1 (abbreviation A1) and a flaky silver powder 2 (abbreviation A2) shown in Table 1 were used as the conductive powder (A), a resin 1 (abbreviation B1), a resin 2 (abbreviation B2) and a resin 3 (abbreviation B3) shown in Table 2 were used as the curable components (B), and these were blended in the blending amounts (parts by mass) shown in Table 4, and a phosphoric acid-containing compound 1 (abbreviation C1) shown in Table 3 was used as the phosphoric acid-containing curable component (C), the phosphoric acid-containing compound 1 was blended in the blending amount (parts by mass) shown in Table 4, and these components were kneaded with a three-roll mill. Accordingly, an electrically conductive adhesive composition of Example 1 was prepared (produced).

For the obtained electrically conductive adhesive composition, test pieces for evaluation of conductivity and adhesive strength were prepared as described above, and the adhesive strength and volume resistivity of the cured adhesive layer (electrically conductive adhesive composition) were evaluated using these test pieces. The results are shown in Table 4. Note that the volume resistivity is described as the "resistance value" in Table 4 (and Table 5).

Examples 2 to 6

Electrically conductive adhesive compositions of Examples 2 to 6 were prepared (produced) in the same manner as in Example 1 except that the content of the phosphoric acid-containing curable component (C) was changed as shown in Table 4, the phosphoric acid-containing compound 2 (abbreviation C2) shown in Table 3 was used, or the blending ratio of the conductive powder (A) and the curable component (B) was changed.

For each of the obtained electrically conductive adhesive compositions, a test piece was prepared as described above, and the adhesive strength and the volume resistivity of the cured adhesive layer (electrically conductive adhesive composition) were evaluated using the test piece. The results are shown in Table 4.

TABLE 4

| Components | | Example 1 | Example 2 | Example 3 |
|---|---|---|---|---|
| Conductive powder (A) | Abbreviation | A1 | A1 | A1 |
| | Parts by mass | 35 | 35 | 35 |
| | Abbreviation | A2 | A2 | A2 |
| | Parts by mass | 30 | 30 | 30 |
| Curable component (B) | Abbreviation | B1 | B1 | B1 |
| | Parts by mass | 5 | 5 | 5 |
| | Abbreviation | B2 | B2 | B2 |
| | Parts by mass | 10 | 10 | 10 |
| | Abbreviation | B3 | B3 | B3 |
| | Parts by mass | 20 | 20 | 20 |
| (A)/(B) [mass ratio] | | 65/35 | 65/35 | 65/35 |
| Phosphoric acid-containing curable component (C) | Abbreviation | C1 | C1 | C1 |
| | Parts by mass | 1 | 5 | 0.1 |
| (C)/(A) + (B) [mass ratio] | | 1 | 5 | 0.1 |
| Results | Adhesive strength | A | A | A |
| | Resistance value [Ω · cm] | $6 \times 10^{-4}$ | $4 \times 10^{-4}$ | $8 \times 10^{-4}$ |

| Components | | Example 4 | Example 5 | Example 6 |
|---|---|---|---|---|
| Conductive powder (A) | Abbreviation | A1 | A1 | A1 |
| | Parts by mass | 35 | 25 | 25 |
| | Abbreviation | A2 | A2 | A2 |
| | Parts by mass | 30 | 25 | 25 |
| Curable component (B) | Abbreviation | B1 | B1 | B1 |
| | Parts by mass | 5 | 8 | 8 |
| | Abbreviation | B2 | B2 | B2 |
| | Parts by mass | 10 | 14 | 14 |
| | Abbreviation | B3 | B3 | B3 |
| | Parts by mass | 20 | 28 | 28 |
| (A)/(B) [mass ratio] | | 65/35 | 50/50 | 50/50 |
| Phosphoric acid-containing curable component (C) | Abbreviation | C2 | C2 | C1 |
| | Parts by mass | 1 | 1 | 0.01 |
| (C)/(A) + (B) [mass ratio] | | 1 | 1 | 0.01 |
| Results | Adhesive strength | A | A | A |
| | Resistance value [Ω · cm] | $7 \times 10^{-4}$ | $7 \times 10^{-4}$ | $8 \times 10^{-4}$ |

Comparative Example 1

An electrically conductive adhesive composition of Comparative Example 1 was prepared (produced) in the same manner as in Example 1 except that the phosphoric acid-containing curable component (C) was not contained as shown in Table 5.

For the obtained electrically conductive adhesive composition, a test piece was prepared as described above, and the adhesive strength and the volume resistivity of the cured adhesive layer (electrically conductive adhesive composition) were evaluated using the test piece. The results are shown in Table 5.

Comparative Examples 2 to 4

Electrically conductive adhesive compositions of Comparative Examples 2 to 4 were prepared (produced) in the same manner as in Example 1 except that, as shown in Table 5, a phosphoric acid-containing compound 3 (abbreviation C3) not corresponding to the formula (1) or (2) was used as the phosphoric acid-containing curable component (C) (Comparative Example 2), or the phosphoric acid-containing compound 3 was used and the blending ratio of the conductive powder (A) and the curable component (B) was changed (Comparative Examples 3 and 4).

For each of the obtained electrically conductive adhesive compositions, a test piece was prepared as described above, and the adhesive strength and the volume resistivity of the cured adhesive layer (electrically conductive adhesive composition) were evaluated using the test piece. The results are shown in Table 5.

TABLE 5

| Components | | Comparative Example 1 | Comparative Example 2 | Comparative Example 3 | Comparative Example 4 |
|---|---|---|---|---|---|
| Conductive powder (A) | Abbreviation | A1 | A1 | A1 | A1 |
| | Parts by mass | 35 | 35 | 50 | 25 |
| | Abbreviation | A2 | A2 | A2 | A2 |
| | Parts by mass | 30 | 30 | 40 | 25 |
| Curable component (B) | Abbreviation | B1 | B1 | B1 | B1 |
| | Parts by mass | 5 | 5 | 2 | 8 |
| | Abbreviation | B2 | B2 | B2 | B2 |

TABLE 5-continued

|  | Components | Comparative Example 1 | Comparative Example 2 | Comparative Example 3 | Comparative Example 4 |
|---|---|---|---|---|---|
|  | Parts by mass | 10 | 10 | 2 | 14 |
|  | Abbreviation | B3 | B3 | B3 | B3 |
|  | Parts by mass | 20 | 20 | 5 | 28 |
| (A)/(B) [mass ratio] |  | 65/35 | 65/35 | 90/10 | 50/50 |
| Phosphoric acid-containing | Abbreviation | — | C3 | C3 | C3 |
| curable component (C) | Parts by mass | — | 1 | 1 | 1 |
| (C)/(A) + (B) [mass ratio] |  | 0 | 1 | 1 | 1 |
| Results | Adhesive strength | A | A | B | A |
|  | Resistance value [Ω · cm] | $8 \times 10^{-3}$ | $9 \times 10^{-3}$ | $1 \times 10^{-4}$ | $9 \times 10^{-2}$ |

Comparison of Examples and Comparative Examples

As is clear from the comparison between the results of Examples 1 to 6 and the results of Comparative Example 1, regarding the electrically conductive adhesive composition according to the present disclosure, not only good adhesive strength can be achieved in the cured adhesive layer, but also the results of Examples 1 to 6 clearly show a lower volume resistance value than the result of Comparative Example 1 by appropriately containing the phosphoric acid-containing curable component (C).

Further, as is clear from the results of Comparative Example 2, in the case of containing the phosphoric acid-containing compound 3 for comparison which does not correspond to the phosphoric acid-containing curable component (C) according to the present disclosure described above, the volume resistance value is apparently higher than the results of Examples 1 to 6. The same applies to the results of Comparative Example 4, and in particular, when the results of Examples 5 or 6 and the results of Comparative Example 4, in which the blending ratios of the conductive powder (A) and the curable component (B) are the same, are compared with each other, good adhesive strength is achieved in both of them, but the volume resistance value is apparently high in Comparative Example 4.

Here, in Comparative Example 3, the content of the conductive powder (A) was relatively larger than those of Examples 1 to 6, and thus, the volume resistance value of Comparative Example 3 was reduced to the same degree as the volume resistance values of Examples 1 to 6. However, the adhesive strength of Comparative Example 3 is apparently inferior to the adhesive strength of Examples 1 to 6. Therefore, it can be seen that by using the phosphoric acid-containing curable component (C), good conductivity and good adhesive strength can be achieved even when the content of the conductive powder (A) is relatively reduced.

As described above, the electrically conductive adhesive composition according to the present disclosure contains a conductive powder (A) and a curable component (B) having a content of 20 parts by mass or more when an amount of the conductive powder (A) is 100 parts by mass, and further contains a phosphoric acid-containing curable component (C) having a general formula of the formula (1) or (2) and having a molecular weight within a range of 150 to 1000 (where X in the formula (1) or (2) is a hydrogen atom (H) or a methyl group ($CH_3$)). The phosphoric acid-containing curable component (C) has a content of 0.01 parts by mass or more and 5 parts by mass or less when a total amount of the conductive powder (A) and the curable component (B) is 100 parts by mass.

According to such a configuration, by using the phosphoric acid-containing curable component (C) in addition to the curable component (B), not only the adhesive strength of the obtained electrically conductive adhesive composition can be better, but also the resistance of the cured product can be reduced. Accordingly, in the electrically conductive adhesive composition containing the conductive powder (A) and the curable component (B), not only better adhesive strength can be achieved, but also the resistance of the cured product can be reduced. Therefore, even if the content of the conductive powder (A) is relatively reduced, the electrically conductive adhesive composition can have good conductive performance.

The present invention is not limited to the embodiments described above, and various modifications can be made without departing from the scope of the claims, and embodiments obtained by appropriately combining technical means disclosed in different embodiments and modified examples are also included in the technical scope of the present invention.

INDUSTRIAL APPLICABILITY

The present invention can be widely and suitably used in the field of electrical devices or electronic devices in which an adherend is adhered in a manner of being electrically conductive. Typically, the present invention can be particularly suitably used in the field of producing a solar cell module.

REFERENCE SIGNS LIST

11: Printing pattern
11a: Wiring pattern
11b: Terminal
11c: Wiring portion
11d: Pad pattern
12: Alumina substrate
13: Rivet
20: Solar cell module
21: Solar cell
22: Cured adhesive layer
30: Solar cell module
31: Solar cell
32: Interconnector

The invention claimed is:

1. An electrically conductive adhesive composition comprising:
a conductive powder (A) and a curable component (B) which has a content of 20 parts by mass or more when an amount of the conductive powder (A) is 100 parts by mass; and a phosphoric acid-containing curable component (C) having a general formula of the following formula (1) or (2),

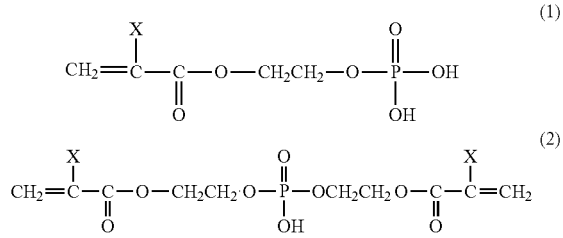

provided that X in the above formula (1) or (2) is a methyl group ($CH_3$),
wherein the phosphoric acid-containing curable component (C) has a content of 0.01 parts by mass or more and 5 parts by mass or less when a total amount of the conductive powder (A) and the curable component (B) is 100 parts by mass,
the conductive powder (A) includes a spherical powder and a flaky powder, the spherical powder has an average particle diameter of 0.1 μm to 10 μm, and the flaky powder has an average particle diameter of 2 μm to 20 μm, and
a mass ratio of the spherical powder/the flaky powder is 50/50 to 54/46.

2. The electrically conductive adhesive composition according to claim 1, wherein the conductive powder (A) is at least one of a silver powder, a silver alloy powder, and a silver-coated powder.

3. The electrically conductive adhesive composition according to claim 1, wherein the curable component (B) is an acrylic resin or a curable composition that forms an acrylic resin when being cured.

4. The electrically conductive adhesive composition according to claim 1, which is used by being applied to a base material by a printing machine or a dispenser.

5. The electrically conductive adhesive composition according to claim 4, which is used for adhering solar cells constituting a solar cell module.

6. The electrically conductive adhesive composition according to claim 1, wherein the phosphoric acid-containing curable component (C) has the general formula of formula (1).

7. The electrically conductive adhesive composition according to claim 1, wherein the phosphoric acid-containing curable component (C) has the general formula of formula (2).

8. The electrically conductive adhesive composition according to claim 1, wherein the phosphoric acid-containing curable component (C) has the content of 1 parts by mass or more and 5 parts by mass or less when the total amount of the conductive powder (A) and the curable component (B) is 100 parts by mass.

9. The electrically conductive adhesive composition according to claim 1, wherein the curable component (B) comprises at least one of an alkyl (meth)acrylate, an aryl (meth)acrylate, and a (meth)acrylate urethane prepolymer.

10. The electrically conductive adhesive composition according to claim 1, wherein the curable component (B) comprises an alkyl (meth)acrylate, an aryl (meth)acrylate, and a (meth)acrylate urethane prepolymer.

11. The electrically conductive adhesive composition according to claim 1, wherein the curable component (B) has the content of 20 parts by mass and more and 100 parts by weight or less based on 100 parts by mass of the conductive powder (A), and
the phosphoric acid-containing curable component (C) has the content of 1 parts by mass or more and 5 parts by mass or less when the total amount of the conductive powder (A) and the curable component (B) is 100 parts by mass.

12. The electrically conductive adhesive composition according to claim 1, wherein the curable component (B) has the content of 20 parts by mass and more and 100 parts by weight or less based on 100 parts by mass of the conductive powder (A),
the phosphoric acid-containing curable component (C) has the content of 1 parts by mass or more and 5 parts by mass or less when the total amount of the conductive powder (A) and the curable component (B) is 100 parts by mass,
the curable component (B) comprises an alkyl (meth)acrylate, an aryl (meth)acrylate, and a (meth)acrylate urethane prepolymer, and
the phosphoric acid-containing curable component (C) is 2-methacryloyloxyethyl acid phosphate or 2-methacryloyloxyethyl acid phosphate.

13. The electrically conductive adhesive composition according to claim 1, wherein the curable component (B) has the content of 20 parts by mass and more and 100 parts by weight or less based on 100 parts by mass of the conductive powder (A),
the phosphoric acid-containing curable component (C) has the content of 1 parts by mass or more and 5 parts by mass or less when the total amount of the conductive powder (A) and the curable component (B) is 100 parts by mass,
the curable component (B) comprises isoamyl acrylate, phenoxyethyl acrylate, and phenyl glycidyl ether acrylate hexamethylene diisocyanate urethane prepolymer, and
the phosphoric acid-containing curable component (C) is 2-methacryloyloxyethyl acid phosphate or 2-methacryloyloxyethyl acid phosphate.

* * * * *